(12) United States Patent
Hankey

(10) Patent No.: US 9,981,318 B2
(45) Date of Patent: May 29, 2018

(54) LATHE FOR MACHINING A WORKPIECE AND RELATED METHODS AND TOOLHOLDERS

(71) Applicant: OBERG INDUSTRIES, Freeport, PA (US)

(72) Inventor: Jeffrey C. Hankey, Kittanning, PA (US)

(73) Assignee: OBERG INDUSTRIES, Freeport, PA (US)

( * ) Notice: Subject to any disclaimer, the term of this patent is extended or adjusted under 35 U.S.C. 154(b) by 89 days.

(21) Appl. No.: 15/095,205

(22) Filed: Apr. 11, 2016

(65) Prior Publication Data

US 2016/0256933 A1 Sep. 8, 2016

Related U.S. Application Data

(62) Division of application No. 13/785,030, filed on Mar. 5, 2013, now Pat. No. 9,352,396.

(51) Int. Cl.
*B23B 29/24* (2006.01)
*B23B 29/12* (2006.01)
*B23B 27/16* (2006.01)

(52) U.S. Cl.
CPC .......... *B23B 29/24* (2013.01); *B23B 27/1677* (2013.01); *B23B 2210/02* (2013.01); *B23B 2270/14* (2013.01); *B23Q 2220/002* (2013.01); *Y10T 82/10* (2015.01); *Y10T 82/2508* (2015.01); *Y10T 407/2202* (2015.01)

(58) Field of Classification Search
CPC ... B23B 29/248; B23B 329/244; B23B 29/04; B23B 27/1651; B23B 2210/02; B23B 29/242; B23B 2270/14; B23B 27/1677; B23B 29/24; B23Q 2220/002; B23Q 39/02
See application file for complete search history.

(56) References Cited

U.S. PATENT DOCUMENTS

| | | |
|---|---|---|
| 146,450 A | 1/1874 | Denison et al. |
| 1,098,026 A | 5/1914 | Domizi |
| 1,342,031 A | 6/1920 | Skibinski |
| 1,721,378 A | 7/1929 | Draeger |
| 1,923,423 A | 8/1933 | Crosby et al. |
| 2,275,327 A | 3/1942 | Sheridan et al. |
| 2,780,857 A | 2/1957 | Twamley |
| 2,848,788 A | 8/1958 | Goglanian |
| 3,124,985 A | 3/1964 | Curtis et al. |
| 3,145,600 A | 8/1964 | Sweet |
| 3,355,797 A | 12/1967 | Lohneis |
| 3,400,439 A | 9/1968 | Lutz |

(Continued)

FOREIGN PATENT DOCUMENTS

DE 3909643 A1 9/1990
JP 08187703 A 7/1996

*Primary Examiner* — Sara Adddisu
(74) *Attorney, Agent, or Firm* — Eckert Seamans Cherin & Mellott, LLC; Arnold B. Silverman

(57) ABSTRACT

A lathe has a plurality of turret positions with at least one having a toolholder, a pair of blades projecting from one end of the toolholder with the toolholder structured to assume a first position with a first blade machining said workpiece which is rotating in a first direction and a second position with a second blade structured to assume a second position with the workpiece rotating in the other direction. The toolholder remains fixed during machining. Related methods and toolholders are disclosed.

13 Claims, 9 Drawing Sheets

(56) References Cited

U.S. PATENT DOCUMENTS

| | | |
|---|---|---|
| 3,495,483 A | 2/1970 | Janik |
| 3,626,793 A | 12/1971 | Rice |
| 3,813,970 A | 6/1974 | Mitchell |
| 3,815,454 A | 6/1974 | Knott |
| 3,823,627 A | 7/1974 | Scharfen |
| 3,893,356 A | 7/1975 | Atzberger |
| 3,955,257 A | 5/1976 | Herbst et al. |
| 4,006,518 A | 2/1977 | Rudolph et al. |
| 4,048,882 A | 9/1977 | Watkins |
| 4,051,750 A | 10/1977 | Berly |
| 4,058,034 A | 11/1977 | Lahm et al. |
| RE29,612 E | 4/1978 | Fullerton |
| 4,087,891 A | 5/1978 | Schering |
| 4,096,613 A | 6/1978 | Takacs et al. |
| 4,111,083 A | 9/1978 | Carter |
| 4,180,894 A | 1/1980 | Link |
| 4,286,485 A | 9/1981 | Dezvane et al. |
| 4,297,925 A | 11/1981 | Ishizuka et al. |
| 4,327,612 A | 5/1982 | Bazuin |
| 4,413,539 A | 11/1983 | Ishizuka et al. |
| 4,471,675 A | 9/1984 | Treloar |
| 4,640,159 A | 2/1987 | Stojanovski |
| 4,674,371 A | 6/1987 | Smolders |
| 4,843,691 A | 7/1989 | Hafla et al. |
| 4,867,021 A | 9/1989 | Bogaerts et al. |
| 5,007,314 A | 4/1991 | Hafla et al. |
| 5,093,973 A | 3/1992 | Steinbach |
| 5,299,476 A | 4/1994 | Tommasini et al. |
| 5,370,023 A | 12/1994 | Morgan et al. |
| 5,755,815 A | 5/1998 | Kochanek |
| 5,768,757 A | 6/1998 | Link |
| 6,128,812 A | 10/2000 | Link et al. |
| 6,502,487 B2 | 1/2003 | Yamazaki et al. |
| 6,565,497 B1 | 5/2003 | Yamazaki et al. |
| 6,708,382 B2 | 3/2004 | Yamazaki et al. |
| 6,716,146 B2 | 4/2004 | Kato |
| 6,901,642 B2 | 6/2005 | Rydberg |
| 7,117,773 B2 | 10/2006 | Katoh et al. |
| 7,121,176 B2 | 10/2006 | Pinger |
| 7,712,401 B1 | 5/2010 | Greenwald |
| 8,297,158 B2 | 10/2012 | Watanabe et al. |
| 8,371,780 B2 | 2/2013 | Meier et al. |
| 8,707,528 B2 | 4/2014 | Ozdyk et al. |
| 8,875,604 B2 | 11/2014 | Tsuyusaki et al. |
| 8,887,360 B2 | 11/2014 | Fukuoka et al. |
| 8,887,363 B2 | 11/2014 | Boyes et al. |
| 2005/0166727 A1 | 8/2005 | Peltonen et al. |
| 2005/0217441 A1 | 10/2005 | Shinohara et al. |
| 2006/0225544 A1 | 10/2006 | Uebelhart |
| 2007/0000360 A1 | 1/2007 | Colarelli et al. |
| 2007/0201958 A1 | 8/2007 | Van Houten |
| 2012/0060336 A1 | 3/2012 | Roden |
| 2015/0128772 A1 | 5/2015 | Hannig |

LATHE FOR MACHINING A WORKPIECE AND RELATED METHODS AND TOOLHOLDERS

CROSS-REFERENCE TO RELATED APPLICATION

This application is a divisional of, and claims priority under 35 U.S.C. § 120 from, U.S. patent application Ser. No. 13/785,030 filed Mar. 5, 2013, entitled "A LATHE FOR MACHINING A WORKPIECE AND RELATED METHODS AND TOOLHOLDERS, the contents of which are incorporated herein by reference.

BACKGROUND OF THE INVENTION

1. Field of the Invention

The present invention relates to an improved lathe apparatus and associated method which provides for enhanced efficiency of machining through the use of a toolholder which contains two blades which are fixed during machining of a rotatable workpiece, thereby, minimizing the downtime and work involved in replacing worn out tools or changing to a different type of tool when a single tool was employed in prior art devices.

2. Description of the Prior Art

It has been known to provide a lathe having a plurality of turret positions with a toolholder having a single blade which served to perform a machining operation. There are a number of drawbacks to such systems, due to the need to suspend the activities while the single tool was replaced due to tool wear or the desire to substitute a different tool for a different purpose. Also, the prior art system required a larger number of turret positions.

U.S. Pat. No. 6,708,382 discloses a machine tool said to be capable of turning machining and machining operations. This is said to be accomplished by employing a number of inserts for the machining and inserts for drilling machining. A tool main body provided for installation of inserts in a detachable fashion. Concave portions are said to be interposed between certain adjacent inserts. Rotation of the tool is specifically contemplated in certain uses.

U.S. Pat. No. 6,502,487 discloses a complex tool having a number of inserts for turning machine operations including ones involving rotation of the workpiece. The tool is said to be fixed. With respect to machining operations, the complex tool is said to be rotated and driven.

While the foregoing two patents do suggest the use of multiple inserts, there remains a very real and substantial need for a system which would independently employ each insert at a different phase of a machining operation.

SUMMARY OF THE INVENTION

The present invention provides a lathe which has a plurality of turret positions with at least one turret position having an elongated toolholder. A pair of relatively spaced blades are secured to an end of the toolholder with the toolholder being structured to assume a first fixed position with a first blade machining a workpiece rotating in a first direction or a second blade position machining a workpiece rotating in a second direction. The toolholder, while in fixed position during machining, moves from a first position to the second position when it is desired to have the other blade machine the workpiece which is rotating in a different direction.

In a preferred form, the tool holder is composed of two sections which are mechanically secured to each other, each of which contains one of the two blades.

The toolholder is structured to remain stationary during the actual machining or turning, but to move between the two positions when it is desired to have one or the other of the blades perform the machining operation.

The distance between the toolholder measured from toolholder centerline to centerline positions is about ¼ inch to 6 inches and preferably about ½ inch to 2 inches.

A related method and machining tool are disclosed.

It is an object of the present invention to provide a lathe which due to the use of multiple tools present on a turret position will reduce the amount of tool change time loss.

It is another object of the present invention to permit a toolbar to have two blades, each of which is structured to be used separately in machining or turning a rotating workpiece.

It is a further object of the present invention to provide such a toolbar which may be moved between two positions, each of which allows one of the two, but not both of the blades, to perform a machining operation on a rotating workpiece.

It is a further object of the present to employ a static tool which is non-live, non-driven, non-rotary in order to double the amount of static tool cutters present at each turret position.

It is another object to provide such a system wherein adequate clearance of the blade not being used from the workpiece is provided in order to contribute to avoidance of undesired interference.

It is yet another object of the invention to provide such a system which will reduce capital equipment cost by reduction in the number of required turret positions.

It is yet another object of the present invention to provide such a system which is effective for OEM design, after market applications, alterations, reworking and/or modifications of existing toolholders.

It is yet another object of the present invention to provide such a system which is readily employed with existing turret stations.

These and other objects will be more fully understood from the following detailed description of the invention on reference to the illustrations appended hereto.

DESCRIPTION OF THE PREFERRED EMBODIMENTS

Figure 1:
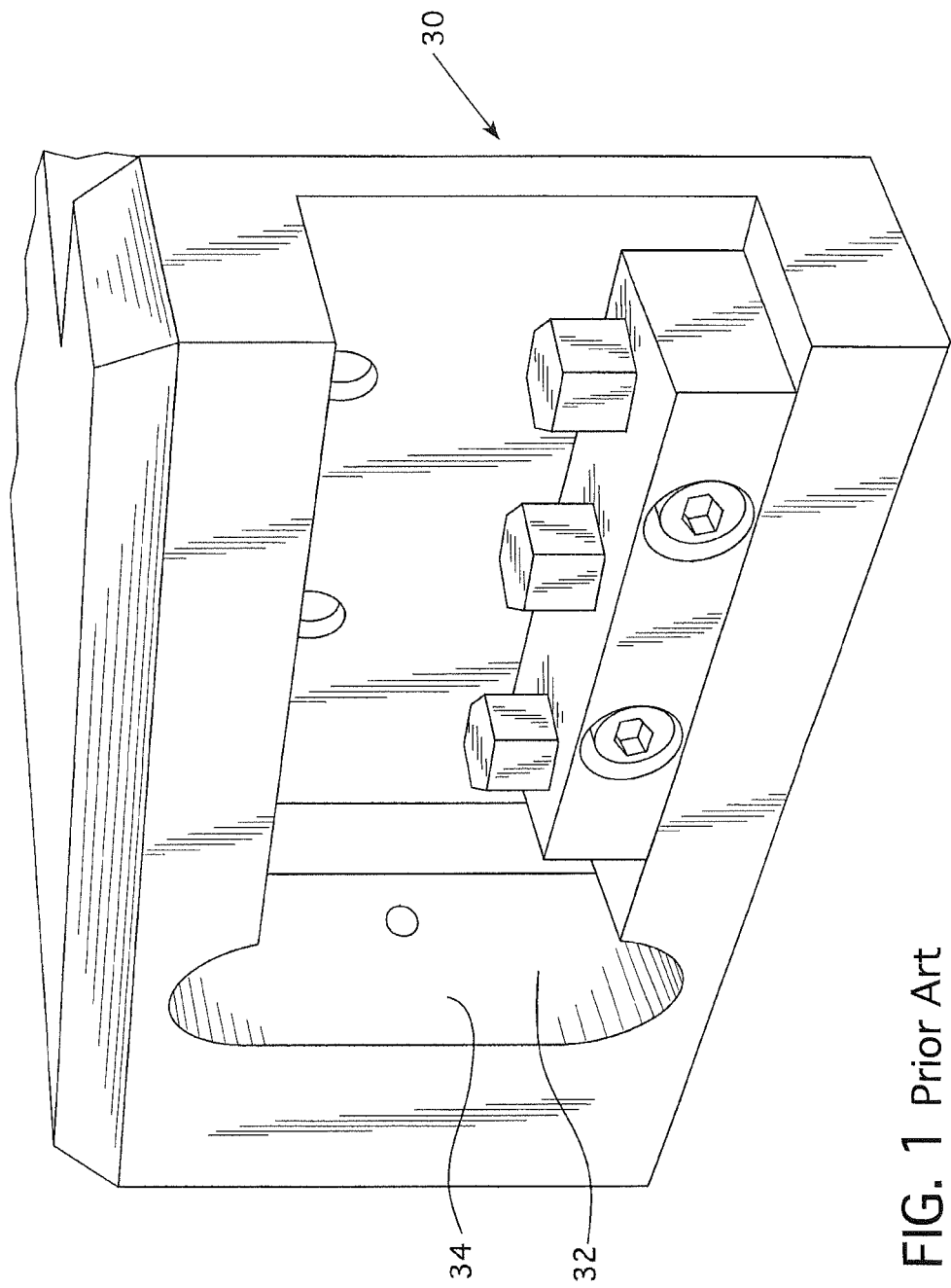
FIG. 1 is a perspective view of the known form of turret position.
Figure 2:
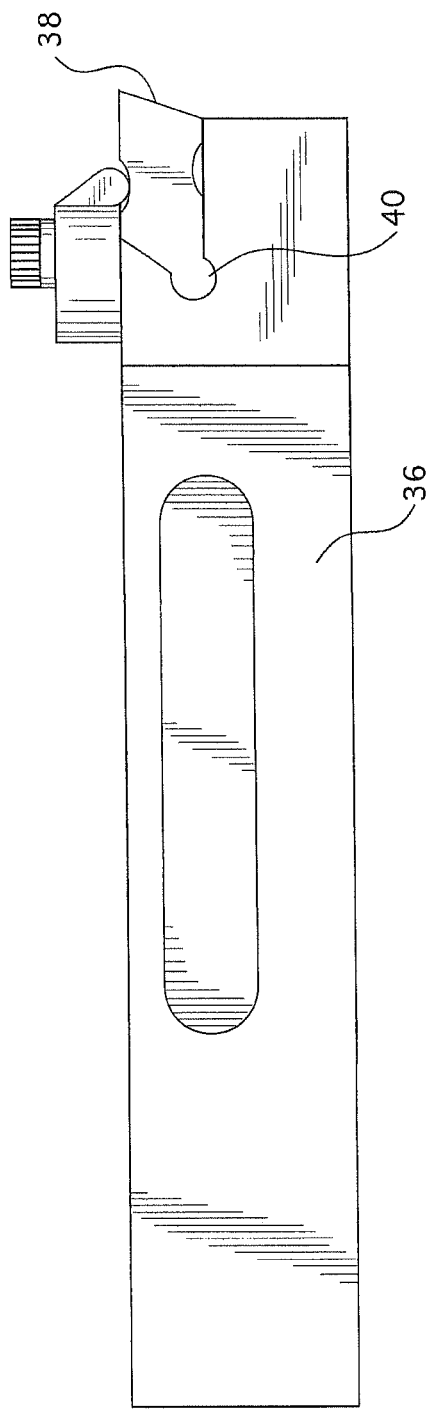
FIG. 2 is an elevational view of a prior art toolholder having a single blade.

Referring to FIGS. 1 through 2, there is shown a prior art turret position 30 which has an elongated recess 32 with a closed end 34. A cutter blade 38 which is detachably secured to the toolholder 36 within recess 40 by fastener 42.

Figure 3:
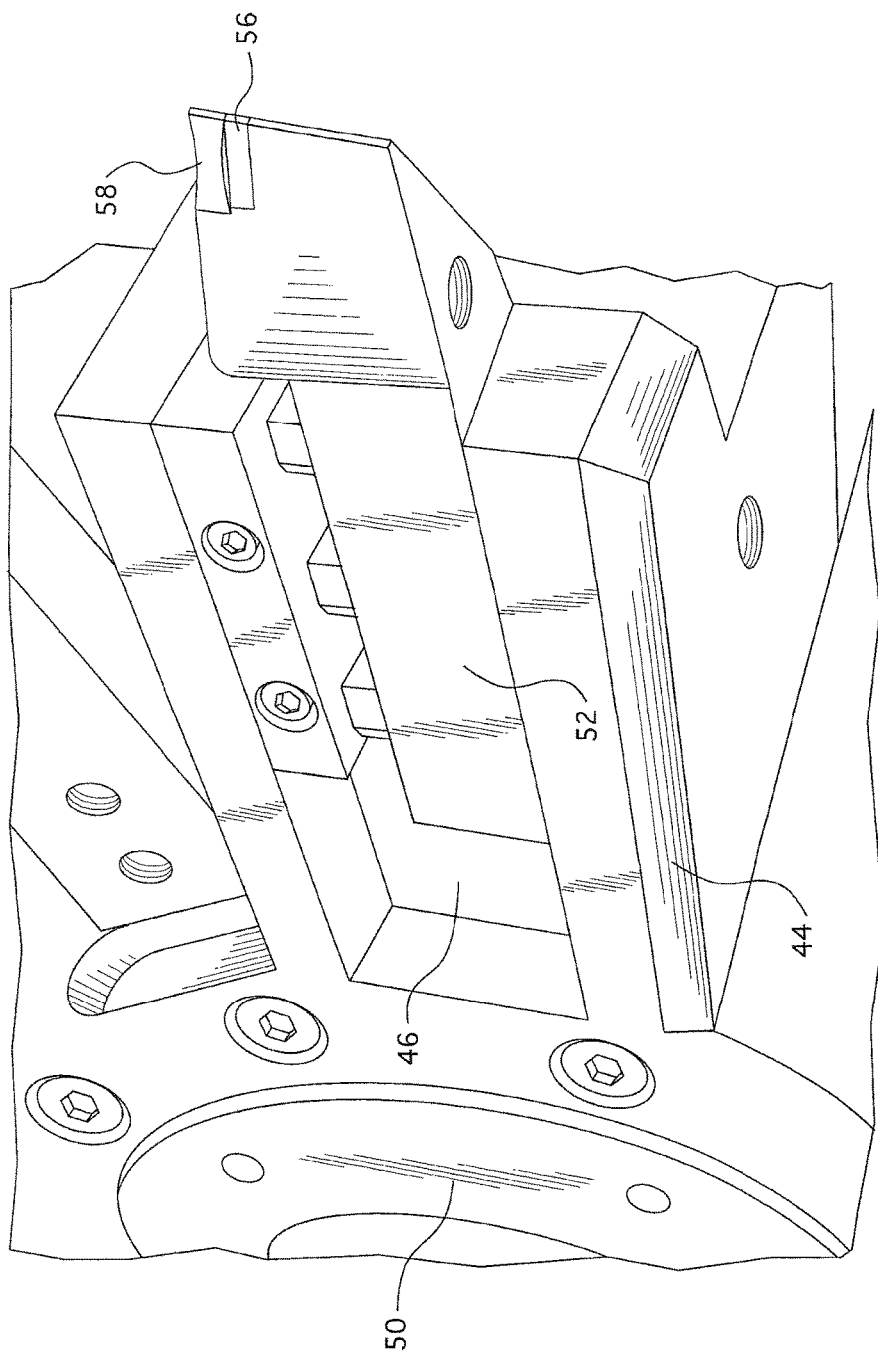
FIG. 3 is a perspective view of a prior art turret position and single blade toolholder.

FIG. 3 shows a turret position 44 having a recess 46 and being secured to a turret wheel 50 with a prior art toolholder 52 secured therein. A blade support 56 underlies the blade 58. It will be appreciated that if one were to desire to change tooling, either because of wear or to employ another tool in substitution, one would have to shut down the operation, remove the toolholder, insert the new toolholder and secure the same in place. This would inherently involve labor and the need to have downtime.

Figure 4:
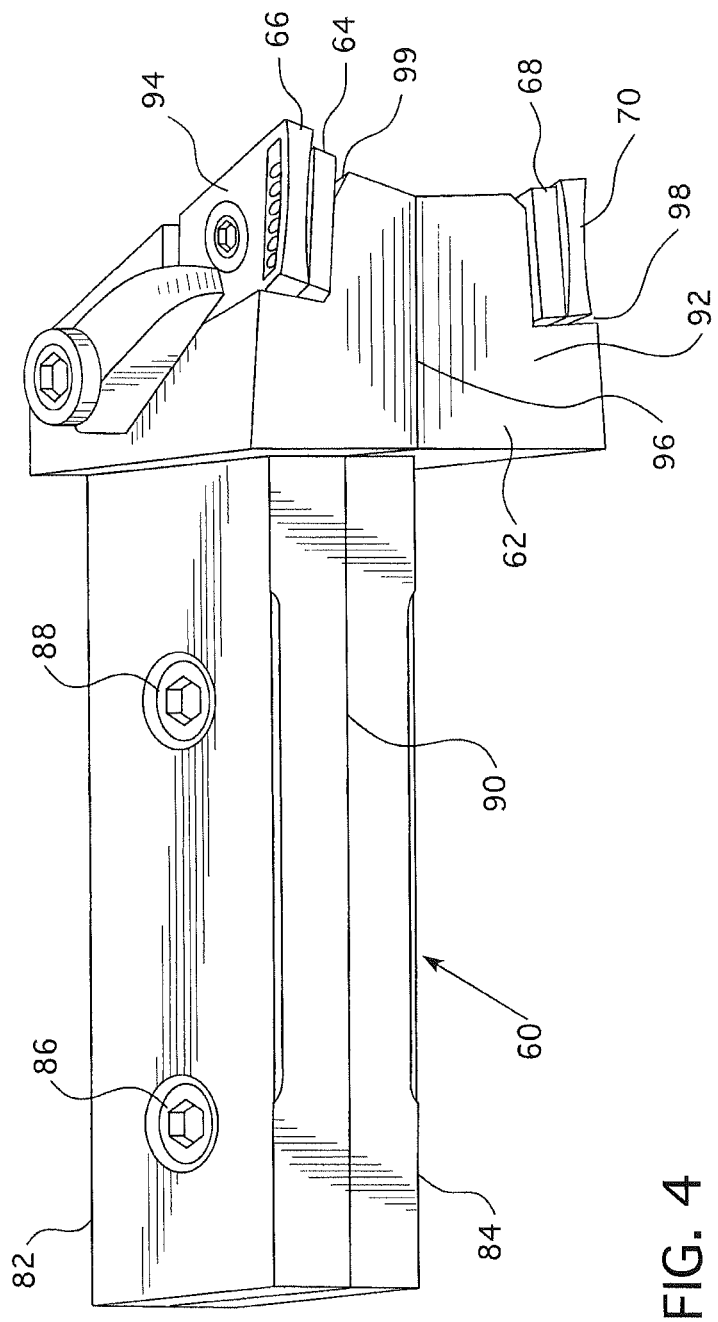
FIG. 4 is a perspective view of a toolholder of the present invention having two blades.
Figure 5:
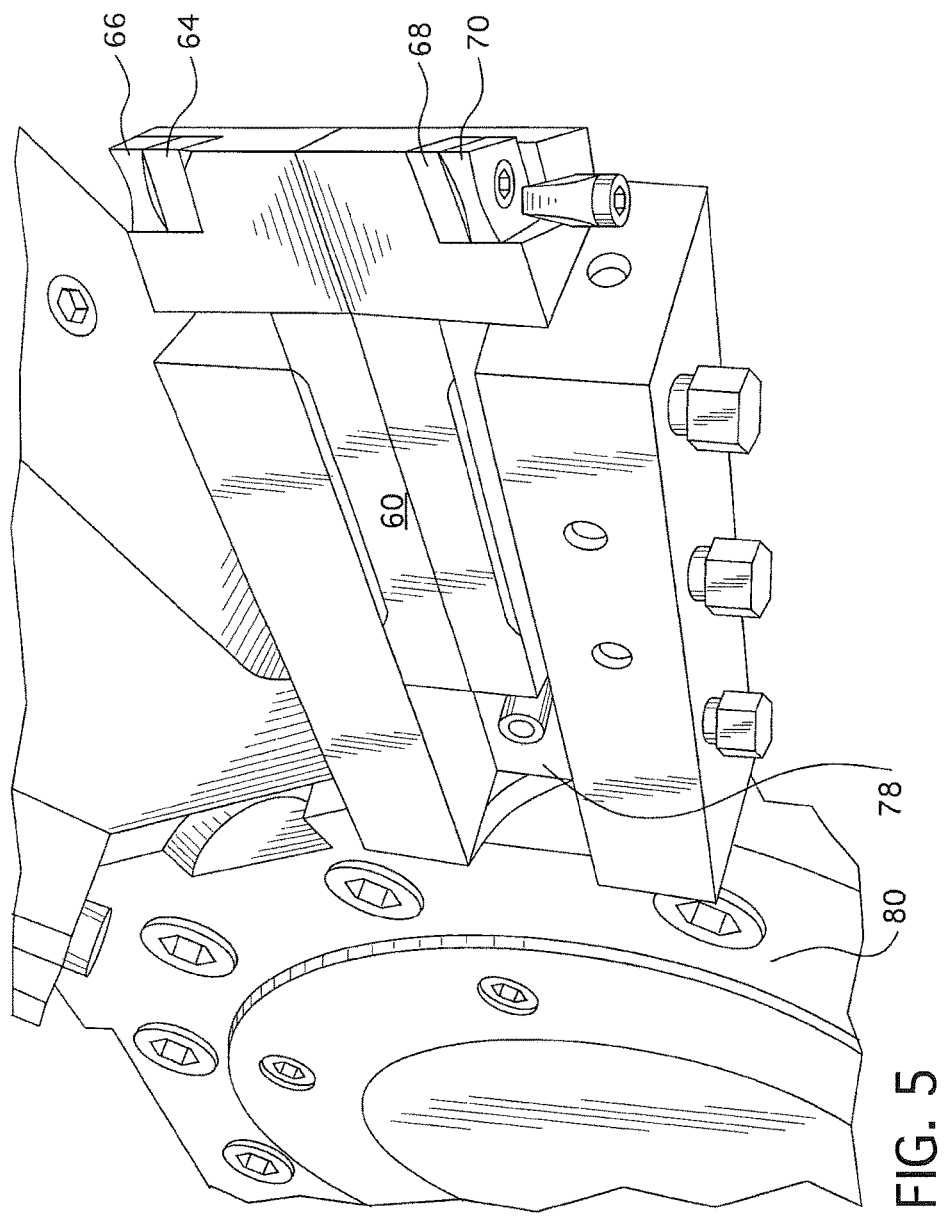
FIG. 5 is a perspective view of a toolholder of the present invention shown in a turret position of a lathe.

Referring to FIGS. 4 and 5, there is shown a toolholder 60 of the present invention which has an enlarged end portion 62 with a blade support 64 underlying an outwardly projecting first blade 66 and a blade support 68 adjacent to outwardly projecting second blade 70. The toolholder is shown in FIG. 5 secured within turret position 78 which radiates from turret wheel 80. The blade assemblies 64, 66, 68, 70 are secured to the enlarged end by mechanical fasteners (not shown) such as bolts or screws.

In the form shown on FIGS. 4 and 5, the toolholder 60 is made from two mirror image components with an upper component 82 being secured to lower component 84 by suitable mechanical fasteners such as bolts 86, 88. The two segments 82, 84 are preferably touching in surface to surface contact along the area designated as 90. The enlarged end portions 92, 94 similarly are in surface to surface contact along line 96. The support 64 and overlying blade 66 as well as support 68 and blade 70 are respectively received within recesses 99, 98 formed within the end sections 94, 92.

Figure 6:
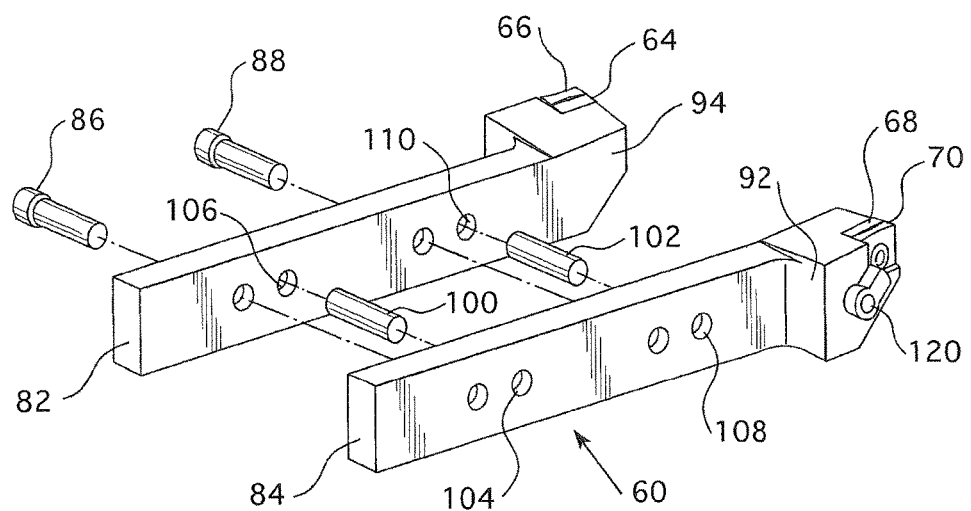
FIG. 6 is an exploded view of a toolholder of the present invention.

With reference to the exploded view shown in FIG. 6, mechanical fastener 120 secures support 68 and blade 70 to the end section 92 and similarly fastener (not shown) secures support base 64 and blade 66 to enlarged element 94. If desired, the two segments 82, 84 may be provided with blind dowels 100, 102 which are secured within respectively holes 104, 106 and 108, 110 for additional securement of segments 82, 84 to each other without being visible from the exterior of the assembly.

Referring to FIGS. 7 through 12, there is shown the previously described toolholder 60. It will be noted that blind dowels 100, 102 secure segments 82, 84 in addition to bolts 86-88.

Figure 7:
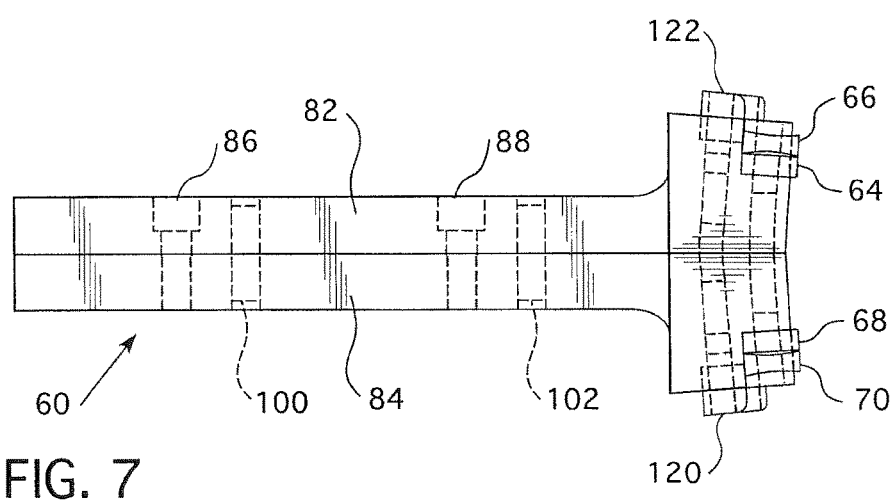
FIG. 7 is a top plan view of a toolholder of the present invention.
Figure 8:
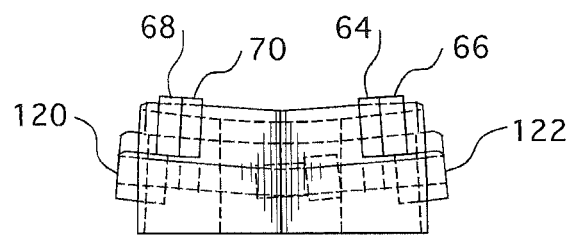
FIG. 8 is a right-hand elevational view of the toolholder of FIG. 7.
Figure 9:
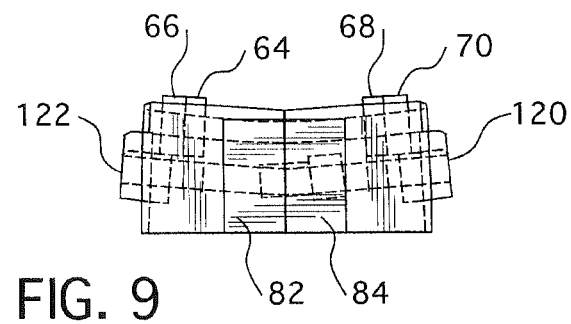
FIG. 9 is a left-hand elevational view of the toolholder of FIG. 7.
Figure 10:
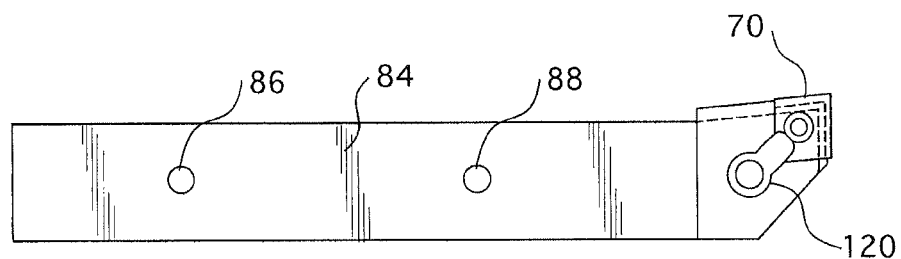
FIG. 10 is a front elevational view of the toolholder of FIG. 7.
Figure 11:
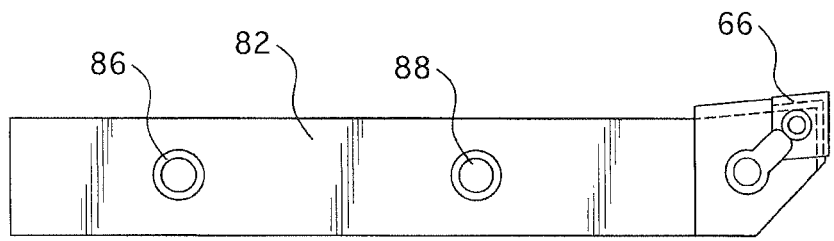
FIG. 11 is a rear elevational view of the toolholder of FIG. 7.
Figure 12:
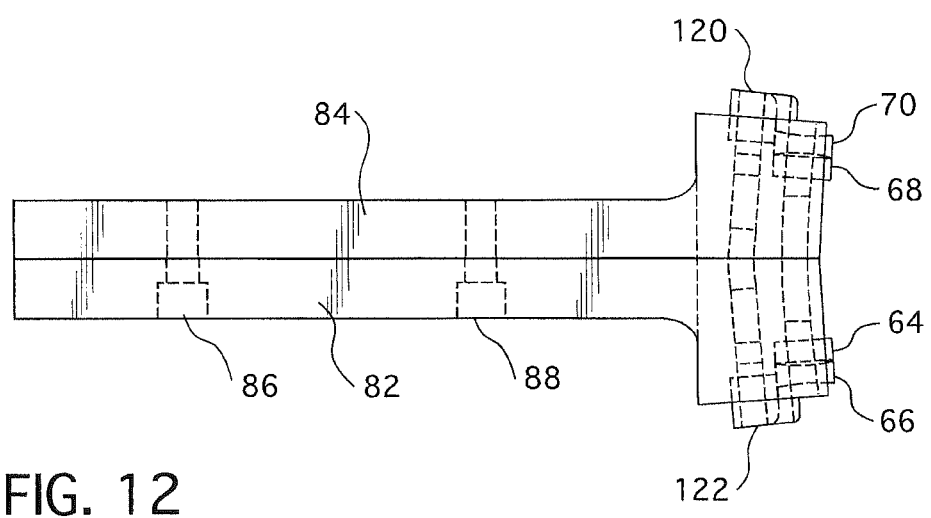
FIG. 12 is a bottom plan view of the toolholder of FIG. 7.

In FIGS. 7 and 8, there is shown the mechanical latch to secure blade 66 in place.

Figure 13:
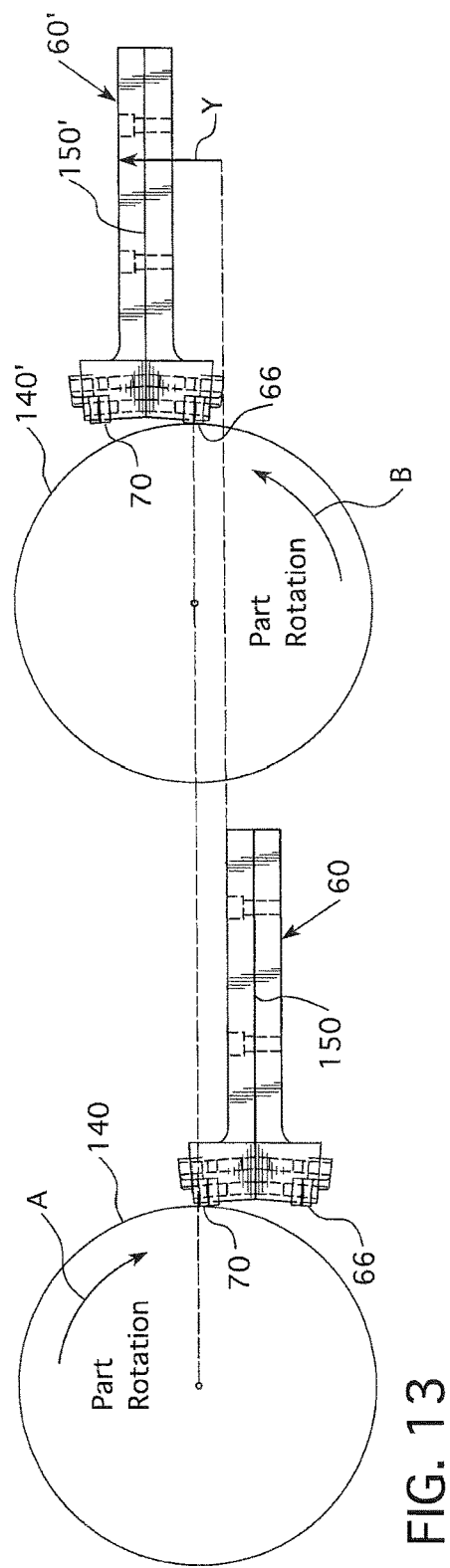
FIG. 13 is a schematic view showing the toolholder of the present invention in two positions with two different directions of rotation.

Referring to FIG. 13, there is shown in the left hand portion, a workpiece 140 rotating in a clockwise direction as shown by arrow A with the toolholder 60 in a first position having blade 70 in contact with and serving to machine the workpiece 140 while blade 66 is out of contact with workpiece 140. As shown in the right hand portion of FIG. 13, the workpiece 140' is rotated in a counterclockwise direction as indicated by arrow B. In this second position of toolholder 60', blade 66 is in contact with workpiece 140' and blade 70 is out of contact with workpiece 140'. The toolholder 60 in the first position has axis 150 and in the second position has axis 150'. It will be appreciated that the orientation of the toolholder 60 in the first position and toolholder indicated as 60' in a second position are essentially the same with their longitudinal axis being of generally parallel orientation. In general, it is preferred that the first position of the toolholder 60 be about ½ to 2 inches from the toolholder position 60' as measured from center line 150 to center line 150'.

It will be appreciated, therefore, that with the unique toolholder and blade construction of the present invention, without a worker being required to remove and replace either tool 66, 70, the first blade 70 effects the desired machining with the clockwise rotating workpiece 140 and, subsequently, after moving the toolholder 60 to position indicated as 60', the other blade 66 provides machining for the counterclockwise rotating workpiece 140'. Individual blade machining, therefore, is achieved without the burdensome need to disassemble and reassemble the tool.

Whereas particular embodiments of the invention have been described hereinbefore for purposes of illustration, it will be evident to those skilled in the art that numerous variations of the details may be made without departing from the invention as to find in the appended claims.

What is claimed is:

1. A method of machining a workpiece comprising
providing a lathe having a plurality of turret positions with at least one said turret position having a toolholder with a pair of relatively spaced blades projecting from an end of said toolholder,
positioning said toolholder in a first position with a first said blade in contact with said workpiece while rotating said workpiece in a first direction and, subsequently, moving said toolholder to second position with a second said blade in contact with said workpiece rotating in the opposite said direction, and
effecting said toolholder movement between said first and second positions by translational movement.

2. The method of claim 1 including
establishing said first toolholder position about ¼ to 6 inches frog z said second toolholder position measured from central axis to central axis.

3. The method of claim 1 including
establishing said toolholder first position and toolholder second position such that the central axis in each position is substantially parallel to the central axis in the other position.

4. The method of claim 1 including
maintaining a said toolholder stationary iii one of said first position and said second position during said machining operation.

5. The method of claim 1 including
maintaining only one of said first blade and said second blade at a time in stationary contact with said workpiece during said machining.

6. The method of claim 1 including
maintaining said toolholder longitudinal axis in an orientation which is generally transverse to the axis of rotation of said workpiece.

7. The method of claim 1 including
employing said first and second blades to machine a generally cylindrical workpiece.

8. The method of claim 1 including
providing said toolholder with a pair of recesses with one said blade secured within each recess simultaneously.

9. The method of claim 8 including
said blades projecting out of said respective recesses.

10. The method of claim 1 including effecting said translational movement between said first position and said second position in a generally vertical direction, and one of said blades being in contact with said workpiece at an elevation generally aligned with the axis of rotation of said workpiece during said machining.

11. A method of machining a workpiece comprising providing a lathe having a plurality of turret positions with at least one said turret position having a toolholder with a pair of relatively spaced blades projecting from an end of said toolholder, positioning said toolholder in a first position with a first said blade in contact with said workpiece while rotating said workpiece in a first direction and, subsequently, moving said toolholder to second position with a second said blade in contact with said workpiece rotating in the opposite said direction, creating said toolholder by joining a first section to a second section with each section being secured to one of said blades.

12. The method of claim 11 including removably securing said first section to said second section to permit separation for replacement of one of said first blade and said second blade.

13. The method of claim 12 including removably securing said first blade to said first section and said second blade to said second section.

* * * * *